Aug. 21, 1956  O. MANN ET AL  2,759,498
APPARATUS FOR FORMING LAMP FILAMENTS
Original Filed May 28, 1949  4 Sheets-Sheet 1

Oliver Mann
Ralph B. Thomas
INVENTORS

BY Joseph C. Ryan
ATTORNEY

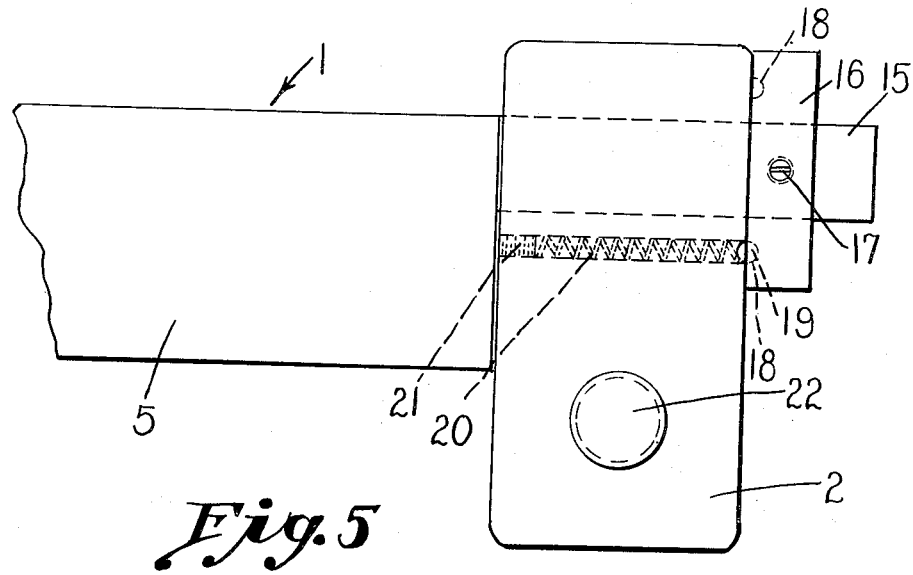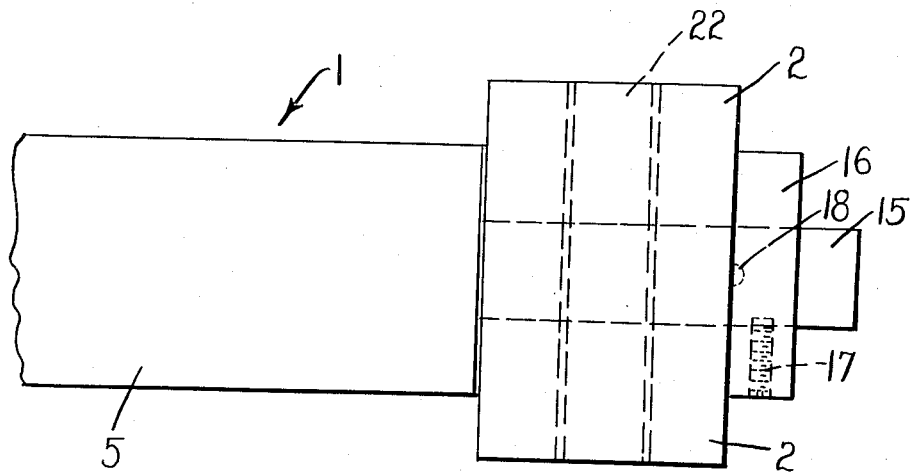

Oliver Mann
Ralph B. Thomas
INVENTORS

BY Joseph C. Ryan

ATTORNEY

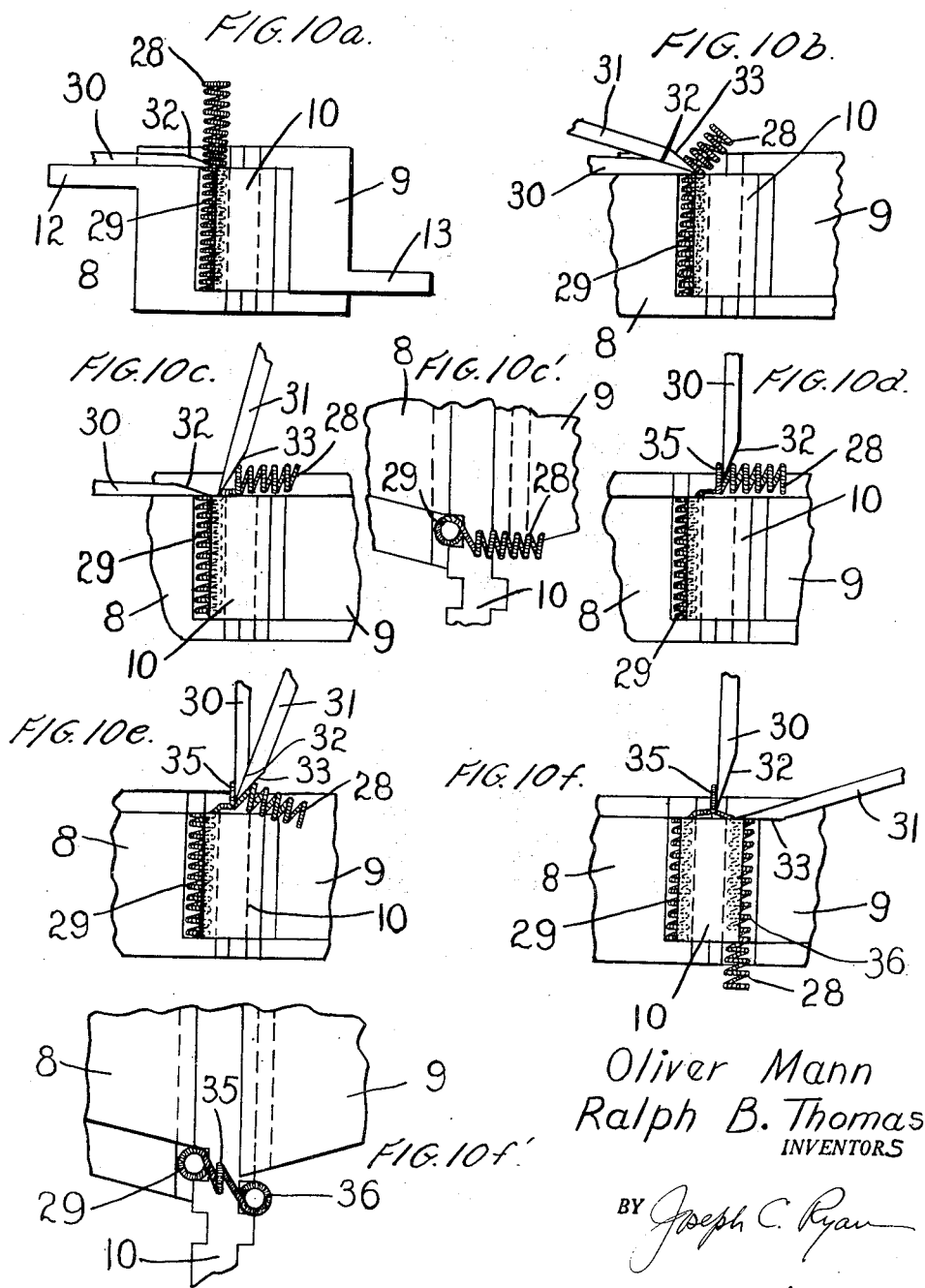

United States Patent Office
2,759,498
Patented Aug. 21, 1956

2,759,498

APPARATUS FOR FORMING LAMP FILAMENTS

Oliver Mann, Danvers, and Ralph B. Thomas, Salem, Mass., assignors to Sylvania Electric Products Inc., Salem, Mass., a corporation of Massachusetts Original application May 28, 1949, Serial No. 95,986, now Patent No. 2,655,952, dated October 20, 1953. Divided and this application June 9, 1953, Serial No. 360,496

3 Claims. (Cl. 140—71.5)

This invention relates to electric lamp filaments and more particularly to filaments of the type employed in high-wattage lamps such as projection lamps, for example.

In the manufacture of filaments for projection lamps, especially filaments of the bi-plane type, considerable care must be exercised to insure uniform length of the several segments of the filament, uniform spacing between each segment and uniform spacing between the planes of the segments. Since a projection lamp filament of high quality requires very close tolerances, considerable care must be taken during the fabricating process to insure the attainment of these tolerances.

We have found that some of the methods previously employed in the fabrication of bi-plane projection lamp filaments have left much to be desired. One of these methods comprises forming the filament from spaced coiling with the length of the wire in each filament-supporting loop being a function of the length of the spacing between each coil segment and the shape of the loop being determined by the peripheral points at which the spaced portion starts and ends. In this and other methods, it has been the practice to transfer the filament, after it has been formed to a firing jig so that when heated to a temperature sufficient to effect a setting thereof it will have a pre-determined form. When the filament is formed from spaced coiling or from continuous coiling and transferred to a firing jig, the close tolerances and uniform spacing described above are quite difficult to attain with any degree of manufacturing consistency.

Accordingly therefore, an object of our invention is to provide an apparatus for fabricating a bi-plane projection lamp filament which is characterized by uniformity in the length of the several segments thereof, uniformity in the spacing between the segments, and uniformity in the spacing between the planes, all within very close tolerances.

Another object is to provide an apparatus for fabricating a bi-plane projection lamp filament which is characterized by uniformity in the spacing between the loops thereof, accurate alignment of each with reference to each other in both the horizontal and the vertical plane, and uniformity in shape.

In accordance with the principles of our invention, segmented coils are formed and jigged from continuous coiling by bending and partially unwinding the continuous coiling to form the several segments of the projection lamp filament and the several loops therebetween from which the filament is supported. This operation is performed on a mandrel which may serve as the firing jig as well as the forming fixture.

Further objects, advantages, and features will be apparent from the following description thereof when read in conjunction with the accompanying drawings in which:

Figure 5 is a side elevational view of the rear end of the jig of Figure 1.

Figure 6 is a top view of the rear end of the jig of Figure 1.

Figure 2:
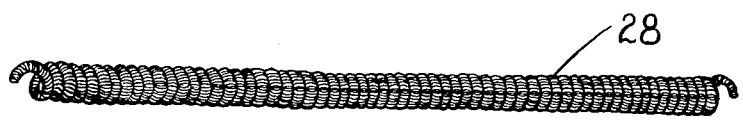
Figure 2 is a side elevational view of a length of coiled-coiled tungsten wire which is folded and jigged on the apparatus of Figure 1.
Figure 3:
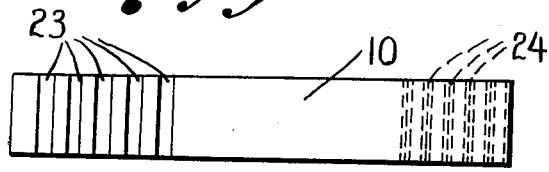
Figure 3 is a side elevational view of the mandrel on which the coiled coiled wire of Figure 2 is folded.
Figure 4:
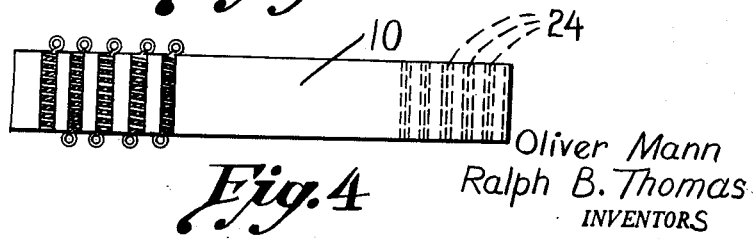
Figure 4 is a side elevational view of the mandrel of Figure 3 with the coiled coiled wire folded thereon.

Figure 10a, b, c, c', d, e, f and f' is a plurality of fragmentary details illustrating the manner in which the coiled coiled tungsten wire of Figure 2 is folded on the mandrel of Figure 3.

Figure 1:
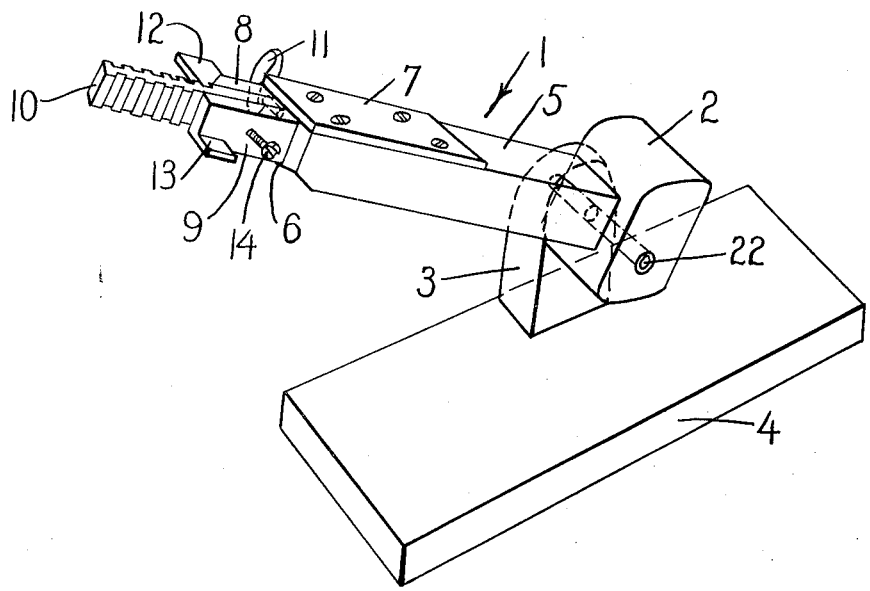
Figure 1 is a perspective view of the apparatus of our invention.

Referring to Figure 1, the apparatus of our invention comprises a jig, generally designated by the numeral 1, mounted in a block 2, which is, in turn, mounted on a support 3 upstanding from a base member 4. The jig 1 comprises a casing 5 with a chamber 6 extending longitudinally therein from one end thereof and is provided with a cover plate 7. A fixed slide 8 and a movable slide 9 are seated within the chamber 6 and a mandrel 10 is disposed therebetween. A locking screw 11 extends through a side of the casing 5, into the chamber 6, and engages the fixed slide 8. By tightening this screw, an operator is able to lock the slides 8 and 9 and the mandrel 10 to one another and the casing 5. The outer ends of the slides 8 and 9 are provided with laterally extending projections, hereinafter referred to as guide shelves 12 and 13 respectively. The movable slide 9 is provided with a screw 14 extending laterally therefrom, to serve as a handle by which an operator may move the slide outwardly, the purpose of which is described more fully below, and as a stop for limiting the inward movement thereof.

The manner in which the jig 1 is mounted in block 2, and the block 2 is mounted on support 3 is illustrated in Figures 1, 5 and 6. The jig 1 is rotatably mounted in block 2 by means of a shaft 15 which projects from an end of the jig and through an aperture therefor in the block, and a ring 16 locked to the shaft 15 by set-screw 17. The adjacent engaging faces of the ring 16 and the block 2 are provided with means for indicating to an operator when the jig has been rotated 180 degrees, the purpose of which will be described more fully below. This means comprises a pair of dimples 18 in the ring 16 and a spring biased ball 19 in the block 2. A spring 20, seated in an aperture therefor in the block 2, is placed under tension by a set-screw 21, thereby exerting a force which tends to effect a seating of the ball 19 in a dimple 18.

The block 2 is secured to the support 3 by means of a locking screw 22 which extends through the support 3 into a threaded aperture therefor in the block 2. This arrangement permits the angle of elevation of the jig 1 to be adjusted so that it may be located in the most satisfactory working position for any given operator.

Figure 7:
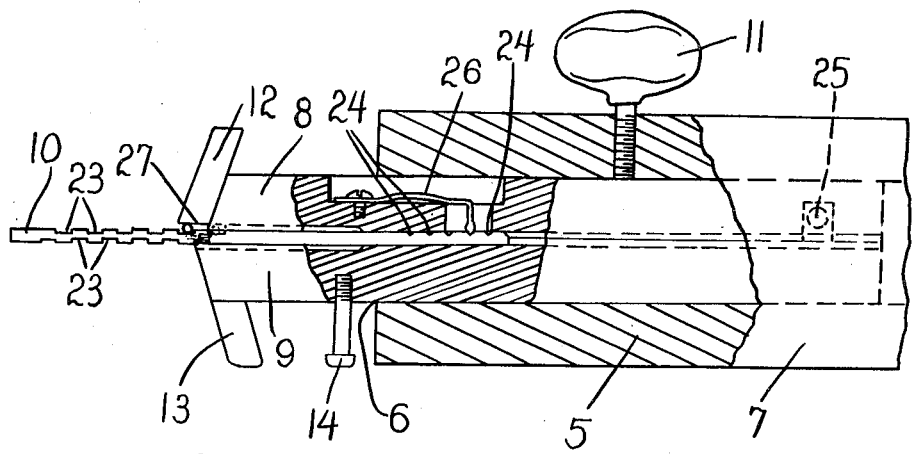
Figure 7 is a top view, partly in section, of the front end of the jig of Figure 1.
Figure 8:
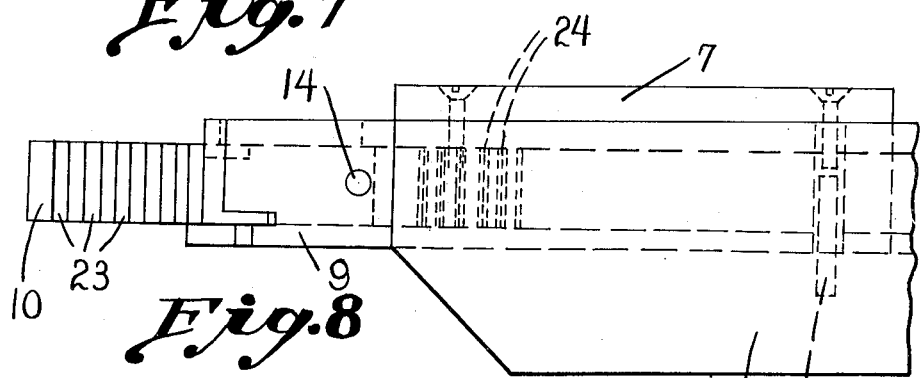
Figure 8 is a side elevational view of the front end of the jig of Figure 1.
Figure 9:
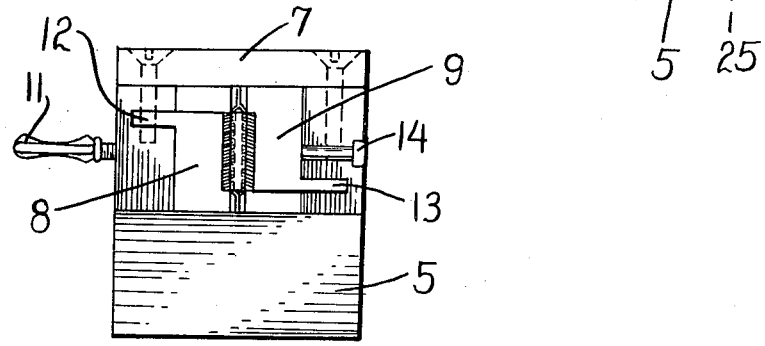
Figure 9 is a front view of the front end of the jig of Figure 1.

Figures 7, 8, and 9 show in detail the slides 8 and 9 and the mandrel 10 therebetween, and the manner in which these members are seated in the chamber 6 provided therefor in the casing 5. The mandrel 10 is a plate of high refractory material such as molybdenum for example, and is provided with a plurality of lateral slots 23 on both faces adjacent one end thereof, and a plurality of indexing grooves 24 on a face adjacent the other end thereof (Fig. 3).

As shown in Figure 7, the slides 8 and 9, which are elongated metal members, are provided on their adjacent, engaging faces with cooperating longitudinal grooves which define a chamber for the mandrel 10. These grooves are deeper at the exposed ends of the slides to provide space for the several segments of the filamentary coil when it is folded on the mandrel 10 (Figures 7 and 9). The fixed slide 8 is pivotally mounted on a pin 25 which prevents longitudinal movement thereof in the chamber 6. As shown in Figure 7, the fixed slide 8 is provided with a resilient spring member 26, one end of which is fixed to the slide and the other end of which is engageable with the indexing grooves 24 on the mandrel 10, the purpose of which is described below. The outside ends of the slides 8 and 9 adjacent the guide shelves 12 and 13 respectively are cut away as at 27 to provide space for the filamentary coil during each folding cycle and to insure proper insertion of a forming tool between the turns of the coil.

The method of forming, from continuous coiling, segmented coils having uniform loops between adjacent segments, on the above-described apparatus, is illustrated in the several views which comprise Figure 10, when read in conjunction with the other figures, particularly Figures 1, 7, 8 and 9. The jig 1 is oriented by positioning it so that the locking screw 11 is on the left side thereof from an operator's point of view. The screw 11 is loosened, and the mandrel 10 is inserted in the chamber therefor defined by the longitudinal grooves in the engaging faces of the slides 8 and 9 with the indexing grooves on the side adjacent the fixed slide. The mandrel is properly seated when it comes to rest against the resilient spring member 26 attached to the fixed slide 8.

The elongated coil of wire 28 is positioned in the jig 1 by inserting an end thereof in the innermost slot 23 on the left side of the mandrel 10, with the free portion thereof extending upwardly from the top of the slot (Fig. 10a). When the segment 29 of the coil 28 has thus been seated, the screw 11 is tightened to lock the mandrel 10 within the slides 8 and 9 and the slides to the casing 5. Folding of the wire 28 about the mandrel 10 by bending and partially unwinding it is accomplished by an operator with the aid of a pair of forming tools 30 and 31, each of which is preferably provided with a beveled tip 32 and 33 respectively.

Forming tool 30, with the bevelled side 32 up, is positioned flat on the surface of the guide shelf 12 and is moved in the direction of the slot in the opposite side of the mandrel and into engagement with the coil 28 (Figure 10a) until it is more than half way past the longitudinal center thereof between the two adjacent turns of the coil at the plane of the upper edge of the mandrel. With forming tool 30 thus seated, forming tool 31 is moved into position flat on the surface of the bevelled edge 32 of the tool 30 and in engagement with the coil 28 (Fig. 10b). Tool 31 is then raised and rolled forward slightly until the coil 28 is disposed substantially perpendicular to the segment 29 thereof (Fig. 10c) and is extending in the direction of the slot in the opposite face of the mandrel (Fig. 10c'). Both tools are then withdrawn from engagement with the coil 28.

With the first forming tool 30 held vertically, and the bevelled side 32 to the right, the operator brings it into engagement with the coil 28 so that one turn thereof, turn 35, is disposed on the left side of the tool (Fig. 10d). Turn 35, after the folding operation has been completed, defines a loop by means of which the filament may be supported in a lamp. With the first forming tool 30 thus positioned, the second forming tool 31 is brought into engagement with the bevelled edge 32 of tool 30 (Figure 10e). A rotary forward movement is imparted to the tool 31, thereby effecting a further bending and partial unwinding of the coil 28 and causing it to move downwardly into a slot 23 on the right side of the mandrel 10 (Figure 10f).

Tools 30 and 31 are then removed from engagement with the coil 28. Segment 36 has now been formed and is disposed as shown in Fig. 10g. The locking screw 11 (Figures 1 and 7) is now loosened, and the movable slide 9 is drawn forwardly a distance sufficient to enclose segment 36 of the coil 28 which has just been positioned in a groove 23 on the right side of the mandrel 10 (Figs. 10f and f'), with the lip of the slide 9 covering and holding segment 36 in position on the mandrel. The screw 11 is then tightened.

The jig 1 is then rotated clockwise 180 degrees to properly position the several parts thereof for the next operation. When this is done, the unfolded portion of the coil 28 is then disposed in the same relative position as that in which the coil 28 is shown in Figure 10a, except that the movable slide 9 instead of the fixed slide 8 will now be disposed on the left. The sequence of steps described above and illustrated in the several parts of Figure 10 is then repeated. Upon completion thereof, the screw 11 is loosened, and the mandrel 10 and slide 9 are pushed inwardly together one indexing position on the indexing grooves 24 (Fig. 7).

The operation of folding the coil 28 by bending and partially unwinding it on the mandrel 10 to form a plurality of segments is continued with the folding steps performed as described above and illustrated in the several parts of Figure 10 and the jig rotated 180 degrees after each segment has been positioned in its proper slot 23. The relative position of the mandrel 10 and the movable slide 9 is adjusted after each folding cycle by alternately drawing the slide 9 forward and pushing the mandrel 10 and slide 9 inward, as described above. The slide 9 is drawn forward when it is on the operator's right, and the mandrel 10 and slide 9 are pushed in when the slide 9 is on the operator's left.

After the folding of the coil 28 on the mandrel 10 has been completed, the mandrel 10, with the coil 28 folded thereon, is withdrawn from the jig 1 and may be positioned on a suitable fixture and fired to effect a setting of the coil.

Although the apparatus of our invention has been specifically described and illustrated with reference to the fabrication of bi-plane electric lamp filaments, its adaptability to the fabrication of other segmented electric lamp filaments will be readily appreciated by those skilled in the art. For example, segmented mono-plane filaments may be readily fabricated by folding all of the filament segments on one side of the mandrel.

This application is a division of our co-pending application Serial Number 95,986, filed May 28, 1949.

What we claim is:

1. Apparatus for forming, from a continuously wound coil of filament wire, an electric lamp filament, having a plurality of coiled segments with a filament supporting loop between each segment, said apparatus comprising: a jig having a chamber therein; a pair of slides disposed in the chamber in said jig with a portion thereof lying outside said chamber; a mandrel slidably seated in said jig between said slides, said mandrel having a plurality of apertures therein for receiving the coiled segments and, in cooperation with said pair of slides within which said mandrel is disposed, to enclose and hold the coiled segments as they are formed; and a guide shelf on the outside end of each said slides.

2. Apparatus for forming, from a continuously wound coil of filament wire, an electric lamp filament, having a plurality of coiled segments with a filament-supporting loop between each segment, said apparatus comprising: a support member; a jig rotatably mounted on said support member, said jig having a chamber therein; a fixed slide and a movable slide disposed in the chamber in said jig with a portion of each lying outside said chamber; a mandrel slidably seated in said jig between said slides, said mandrel having a plurality of apertures therein for receiving the coiled segments and, in cooperation with said pair of slides within which said mandrel is disposed, to enclose and hold the coiled segments as they are formed; and a guide shelf on the outside end of each of said slides.

3. Apparatus for forming, from a continuously wound coil of filament wire, an electric lamp filament having a plurality of coiled segments with a filament-supporting loop between each segment, said apparatus comprising: a jig having a chamber therein; a fixed slide and a movable slide disposed side-by-side in said chamber and in engagement with one another, the engaging faces thereof being provided with cooperating longitudinal grooves; and a mandrel slidably seated within said grooves, said mandrel having a plurality of apertures therein for receiving the coiled segments and, in cooperation with the grooves in said slides, to enclose and hold the coiled segments as they are formed.

References Cited in the file of this patent

UNITED STATES PATENTS

| | | |
|---|---|---|
| 1,726,480 | Fehse | Aug. 27, 1929 |
| 2,449,653 | Isaac | Sept. 21, 1948 |